United States Patent
Helgenberg et al.

(10) Patent No.: US 6,789,826 B1
(45) Date of Patent: Sep. 14, 2004

(54) LATCHING SYSTEM

(75) Inventors: John A. Helgenberg, Paoli, PA (US); Terry W. Louth, Navron, PA (US); Kenneth J. Neeld, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/443,233

(22) Filed: Nov. 18, 1999

(51) Int. Cl.[7] .............................................. E05B 15/02
(52) U.S. Cl. ............ 292/341.15; 292/300; 292/DIG. 61
(58) Field of Search ....................... 292/341.15, 341.13, 292/300, 302, 303, 299, 17, 19, DIG. 61, 146, 147, 152; 411/516, 517; 24/662, 672–674, 676, 606, 640

(56) References Cited

U.S. PATENT DOCUMENTS

| | | | |
|---|---|---|---|
| 786,183 A | | 3/1905 | Bend |
| 942,129 A | | 12/1909 | Broga |
| 1,047,782 A | | 12/1912 | German |
| 1,195,678 A | | 8/1916 | Herzog |
| 1,321,974 A | | 11/1919 | Bourque |
| 1,542,761 A | | 6/1925 | Carr |
| 1,550,621 A | | 8/1925 | Lawton |
| 1,866,326 A | * | 7/1932 | Stevens ...................... 292/13 |
| 2,085,486 A | | 6/1937 | Villani |
| 2,151,284 A | | 3/1939 | Tinnerman |
| 2,255,217 A | * | 9/1941 | Hill .............................. 85/8.5 |
| 2,530,365 A | | 11/1950 | Johnson et al. |
| 2,577,507 A | * | 12/1951 | Bergdorf ..................... 292/17 |
| 2,615,735 A | * | 10/1952 | Heimann ....................... 287/53 |
| 2,833,583 A | | 5/1958 | Stone et al. |
| 2,942,905 A | | 6/1960 | Wootton |
| 2,993,718 A | | 7/1961 | Ahlgren |
| 3,079,658 A | | 3/1963 | Shears et al. |
| 3,086,803 A | * | 4/1963 | Wilson ........................ 292/17 |
| 3,222,096 A | * | 12/1965 | Kaman ........................ 287/53 |
| 3,596,867 A | * | 8/1971 | Allander ..................... 248/475 |
| 3,791,096 A | * | 2/1974 | Epperlein .................... 52/758 |
| 3,910,566 A | * | 10/1975 | Pedersen .................... 267/167 |
| 4,022,504 A | | 5/1977 | Anderson |
| 4,678,210 A | * | 7/1987 | Balsells ...................... 285/318 |
| 4,750,762 A | * | 6/1988 | Corzine ........................ 285/45 |
| 4,805,272 A | * | 2/1989 | Yamaguchi .................. 24/623 |
| 4,906,031 A | * | 3/1990 | Vyse .......................... 285/318 |
| 5,049,072 A | * | 9/1991 | Lueschen .................... 433/173 |
| 5,154,308 A | * | 10/1992 | Larson ....................... 220/403 |
| 5,284,369 A | * | 2/1994 | Kitamura .................... 285/322 |
| 5,570,910 A | * | 11/1996 | Highlen ...................... 285/308 |
| 5,603,532 A | * | 2/1997 | Guest ......................... 285/305 |
| 5,639,113 A | * | 6/1997 | Goss ......................... 280/728.2 |

* cited by examiner

Primary Examiner—Gary Estremsky
(74) Attorney, Agent, or Firm—Ratner Prestia; Michael B. Atlass; Mark T. Starr

(57) ABSTRACT

A system is provided for releasable engagement between two structures. The system includes a stud extending outwardly from one of the structures along an axis. The system also includes a resilient member positioned adjacent a surface of the other one of the structures. The resilient member is configured to expand radially outwardly to permit passage of the stud, yet the surface of the structure contacting the outer surface of the resilient member prevents movement of the outer surface radially outwardly. The resilient member is configured to engage the stud for releasable engagement, thereby providing releasable engagement between the structures.

8 Claims, 18 Drawing Sheets

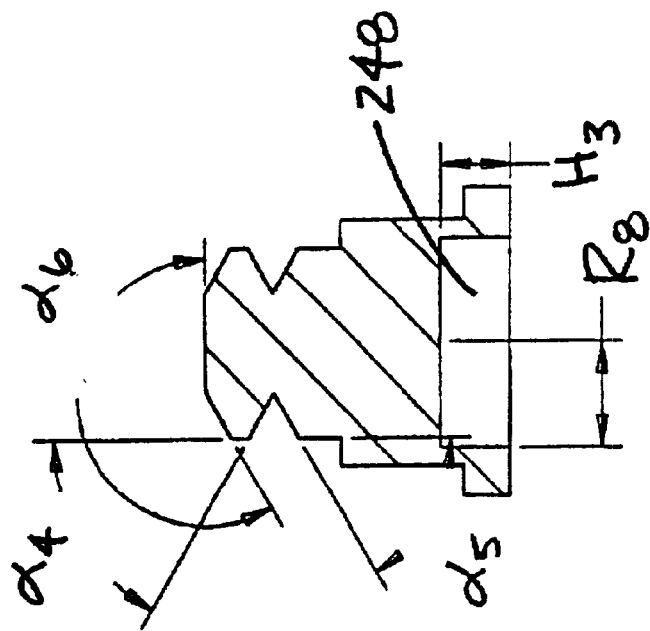
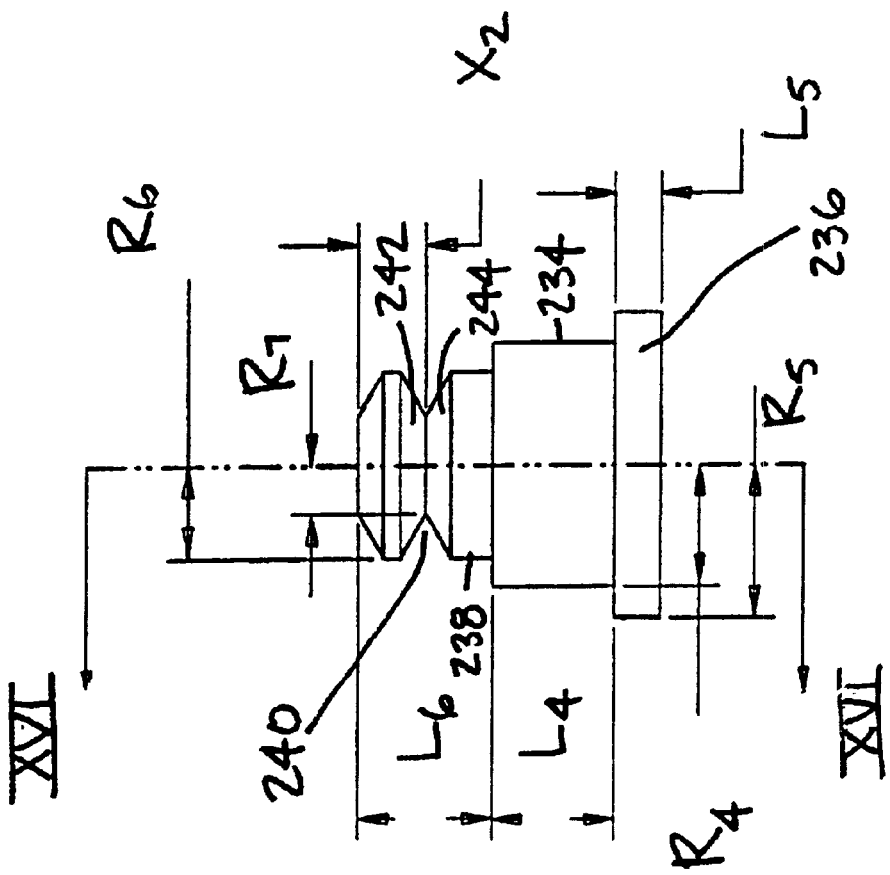
Fig. 16
Fig. 15

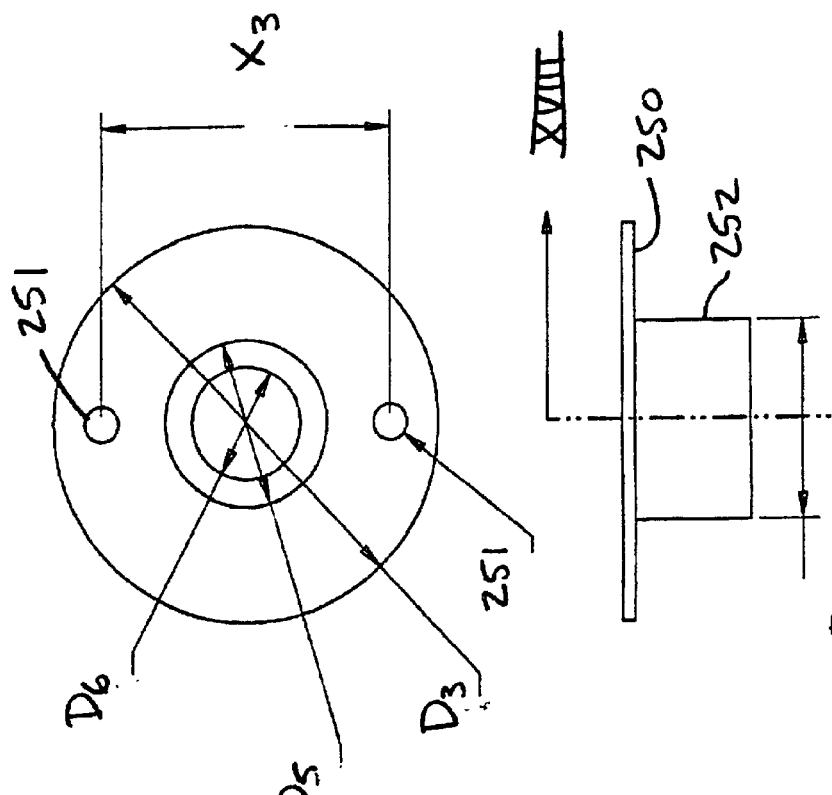
Fig. 19
Fig. 17
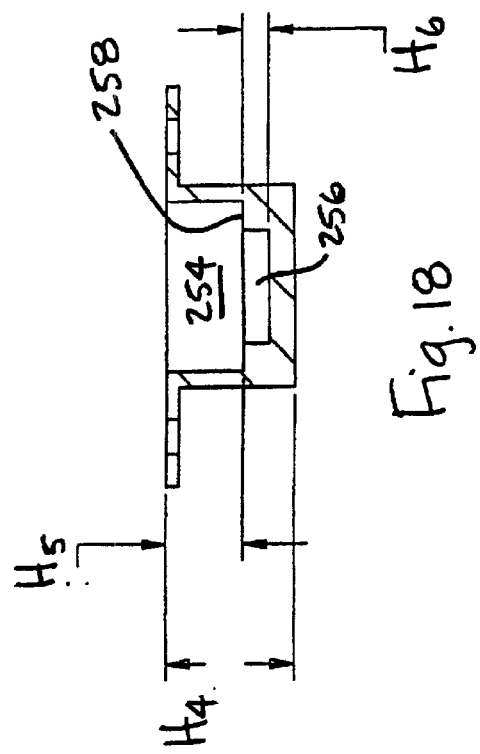
Fig. 18

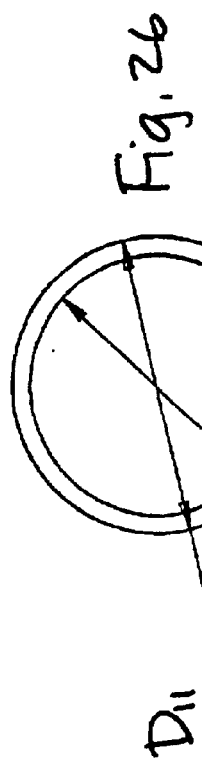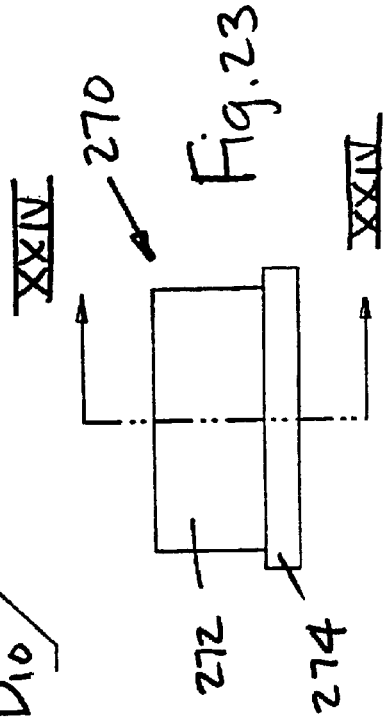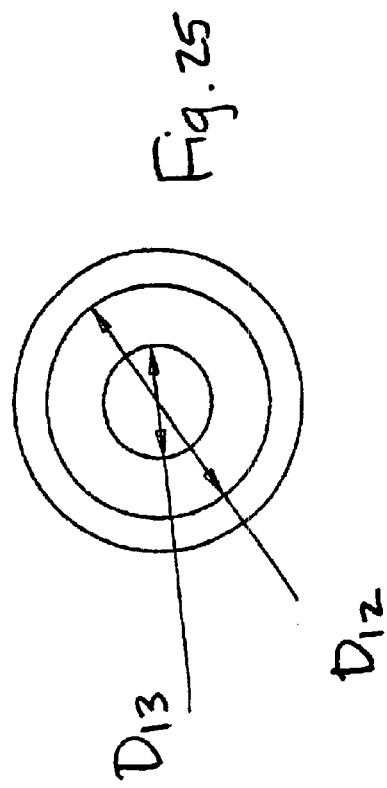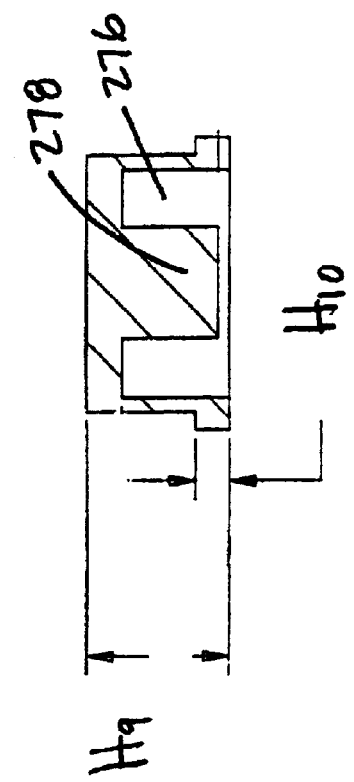
Fig. 26
Fig. 23
Fig. 25
Fig. 24

LATCHING SYSTEM

FIELD OF THE INVENTION

This invention relates to a system for providing releasable engagement between two structures. More particularly, this invention relates to a system adapted to maintain a predetermined gap between two engaged structures.

BACKGROUND OF THE INVENTION

Latching systems are often used for latching structures such as a hinged door to a fixed frame. In certain applications, such latching systems require a turning motion such as would be needed with a conventional latch and pawl system.

In some instances, latching mechanisms may be required for large doors such as sheet metal or molded plastic doors. Such doors can be several feet in height, and twisting and bowing of the doors can become a problem. Moreover, such twisting and bowing of the doors can result in the formation of an inconsistent gap between the door and the frame, which may not be aesthetically appealing. Also, in applications such as computer system housings where the housing door provides an electromagnetic interference (EMI) seal, such gaps can result in leakage and system failure.

In order to resolve the problems associated with variable gaps, it has been proposed to use retention points at several locations along the latched edge of the door. Typically, these retention points are at the top, bottom, and center portions of the door. It has been proposed to use tie rods or cables that span the distance between these spaced retention points in order to ensure that the latches all disengage appropriately when the door is opened.

It has been recognized, however, that such tie rod or cable systems take up space along the edge of the door. The use of such tie rod or cable systems therefore limits the availability of space for other structural features including, for example, stiffening features of the door.

Accordingly, there remains a need for a cost-effective system for latching a hinged door to a fixed frame. Preferably, the latching system should be capable of operation without requiring a turning motion, such as that of a latch and pawl system Furthermore, the latching system should preferably be capable of providing a secure fit with a consistent gap maintained along the interface between a door and a frame. Also, where multiple latches are desired, the latching system should preferably provide latch engagement for each latch that is independent of the others, thereby avoiding the requirement of mechanical linkages between the latches that reduce the available space in the door or frame for other mechanical or cosmetic features, and thereby reducing the cost of such linkages as well as the assembly time associated therewith.

SUMMARY OF THE INVENTION

This invention provides a system for providing releasable engagement between two structures such as the door and frame of a computer housing, for example. The system includes a stud extending outwardly from one of the structures along an axis. The outer surface of the stud can be grooved about its circumference to define a surface oriented at an angle to the axis. The system also includes a resilient member positioned adjacent a surface of the other one of the structures. The resilient member has a substantially torroidal configuration, an outer surface contacting the surface of the housing structure to prevent movement of the outer surface radially outwardly, and an inner surface that is movable radially outwardly.

The torroidal configuration of the resilient member defines an opening that is smaller than the stud. The opening of the resilient member is configured to expand radially outwardly to permit passage of the stud Also, the resilient member is configured to engage the surface of the stud for releasable engagement of the stud, thereby providing releasable engagement between the structures.

According to a preferred feature of the invention, the system can also include means positioned adjacent to the resilient member for urging the stud outwardly from the resilient member. According to one preferred embodiment, the urging means includes a button positioned for movement along the axis of the stud to urge the stud out from the resilient member along the stud's axis. According to another preferred embodiment, the urging means includes a lever positioned to urge the stud out from the resilient member along the axis of the stud.

When used with larger structures, the system according to this invention can include a plurality of studs and resilient members. The system according to this invention makes it possible to maintain a predetermined gap between such structures.

BRIEF DESCRIPTION OF THE FIGURES

Exemplary embodiments of the invention will be described in detail with reference to figures, of which:

FIG. 15 is a side view of an embodiment of a stud component of the frame portion shown in FIG. 14;

FIG. 16 is a cross-sectional side view of the stud component shown in FIG. 15;

FIG. 17 is a side view of an embodiment of a housing component of the frame portion illustrated in FIG. 14;

FIG. 18 is a cross-sectional side view of the housing component illustrated in FIG. 17;

FIG. 19 is a bottom view of the housing component illustrated in FIGS. 17 and 18;

FIG. 23 is a side view of an embodiment of a button component of the door portion of the latching system shown in FIG. 20;

FIG. 24 is a cross-sectional side view of the button component shown in FIG. 23;

FIG. 25 is a bottom view of the button component shown in FIG. 23;

FIG. 26 is a top view of the button component shown in FIG. 23;

DETAILED DESCRIPTION OF THE INVENTION

Exemplary embodiments of the invention will now be described with reference to preferred features selected for illustration in the figures. It will be appreciated that the spirit and scope of the invention is not limited to the embodiments selected for is illustration. It will also be appreciated that the figures are not rendered to any particular scale or proportion The scope of the invention will be defined separately in the appended claims.

Figure 1A:
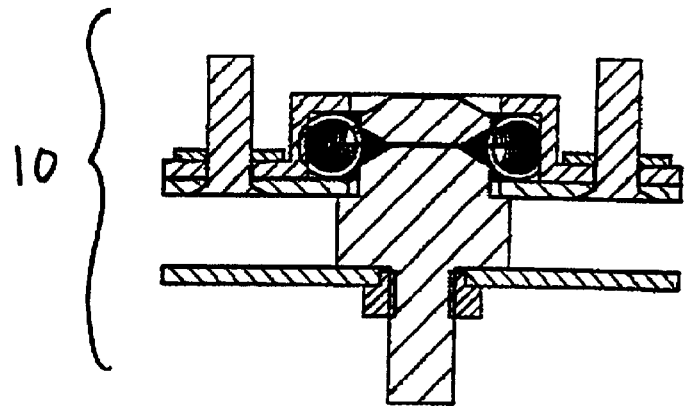
FIG. 1A is a cross-sectional side view of an embodiment of a latching system according to this invention, with a fixed stud component.
Figure 1B:
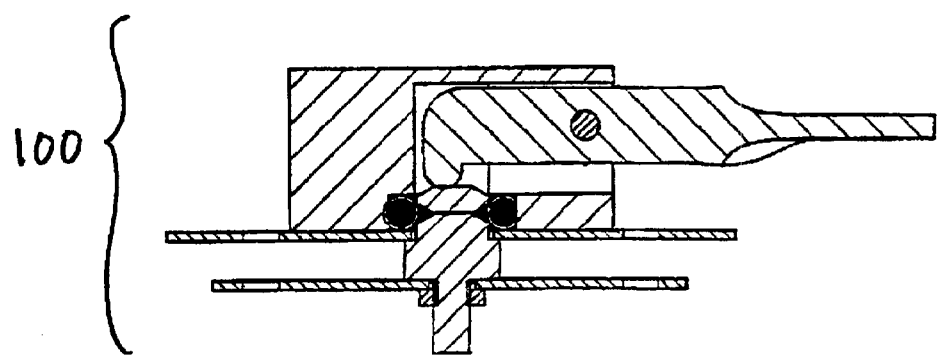
FIG. 1B is a cross-sectional side view of another embodiment of a latching system according to this invention, with a fixed stud component.
Figure 1C:
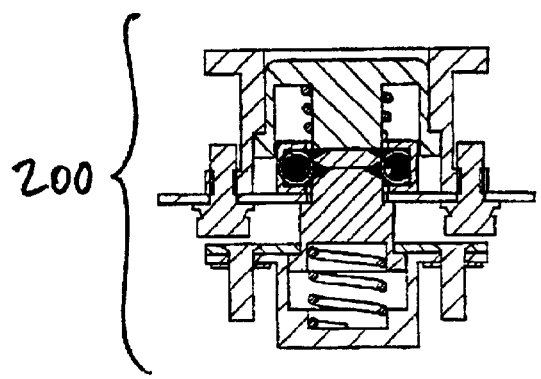
FIG. 1C is a cross-sectional side view of yet another embodiment of a latching system according to this invention, with a spring mounted or "floating" stud component.
Figure 2:
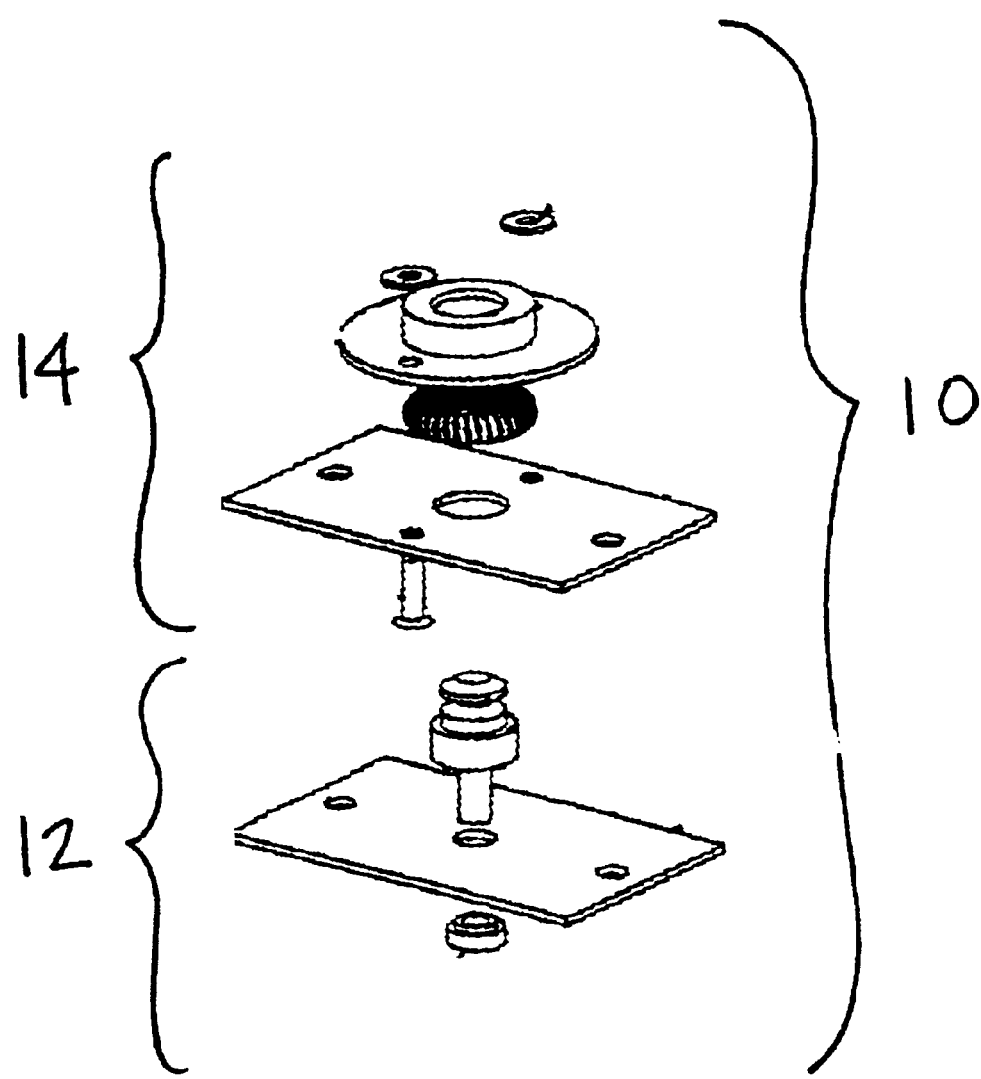
FIG. 2 is an exploded perspective view of the latching system shown in FIG. 1A.

Preferred embodiments of a latching system according to this invention are illustrated in FIGS. 1A, 1B, and 1C. The embodiment illustrated in FIG. 1A utilizes a friction fit between a stud and a resilient member. The embodiment illustrated in FIG. 1B utilizes a lever in order to help release the stud from the resilient member. The embodiment illustrated in FIG. 1C utilizes a button to help release the stud from the resilient member.

Generally, the system according to this invention provides releasable engagement between two structures such as a door and a fame of a computer housing, for example. Referring generally to the figures, the system includes a stud 22 extending outwardly from one of the structures along an axis, wherein the stud 22 has an outer surface such as a groove 32 oriented at an angle to the axis. The system also includes a resilient member such as a radial spring 50 that is positioned adjacent a surface such as surface 62 of the other one of the structures. The resilient member has a substantially torroidal configuration, an outer surface contacting the surface 62 of the structure to prevent movement of the outer surface radially outwardly, and an inner surface movable radially outwardly.

The torroidal configuration of the resilient member defines an opening smaller than the stud 22, and the opening of the resilient member is configured to expand radially outwardly to permit passage of the stud 22. The resilient member is also configured to engage the surface 32 of the stud 22 for releasable engagement of the stud 22, thereby providing releasable engagement between the structures.

Referring now to FIGS. 1A and 2–8, a first preferred embodiment of a latching system according to this invention will now be described. Latching system 10 shown in FIGS. 1A and 2 utilize a friction fit between a cylindrical stud mounted to a frame and a radial spring mounted in a housing on the door. In other words, frictional interference between the stud and the spring retains the door in engagement with the frame. Disengagement is accomplished by merely pulling the door away from the frame, thereby overcoming the friction fit between the spring and the stud.

More specifically, latching system 10 is adapted to provide releasable engagement between a structure such as a frame portion 12 and a structure such as a door portion 14. An exploded view of the frame portion 12 and the door portion 14 of latching system 10 is provided in FIG. 2.

Figure 3:
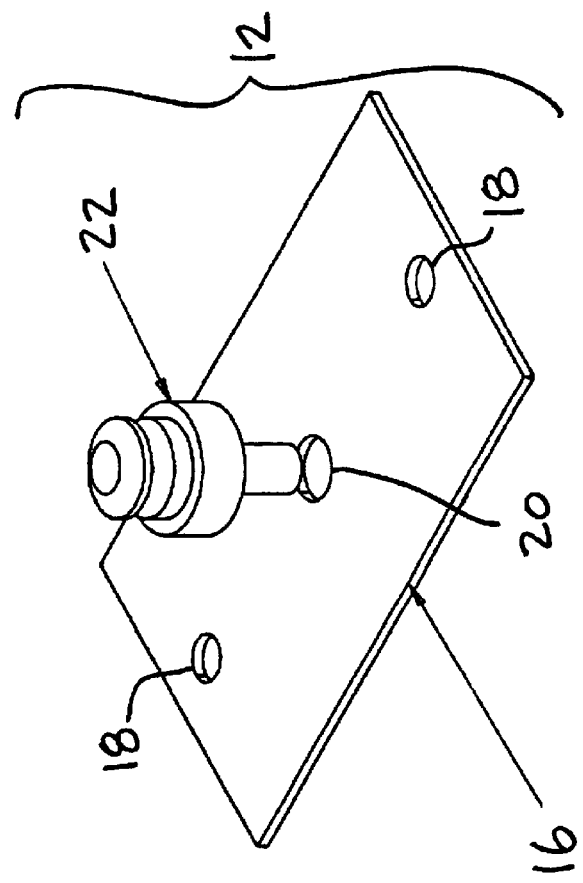
FIG. 3 is an exploded top perspective view of an embodiment of a frame portion of the latching system shown in FIG. 1A.
Figure 4:
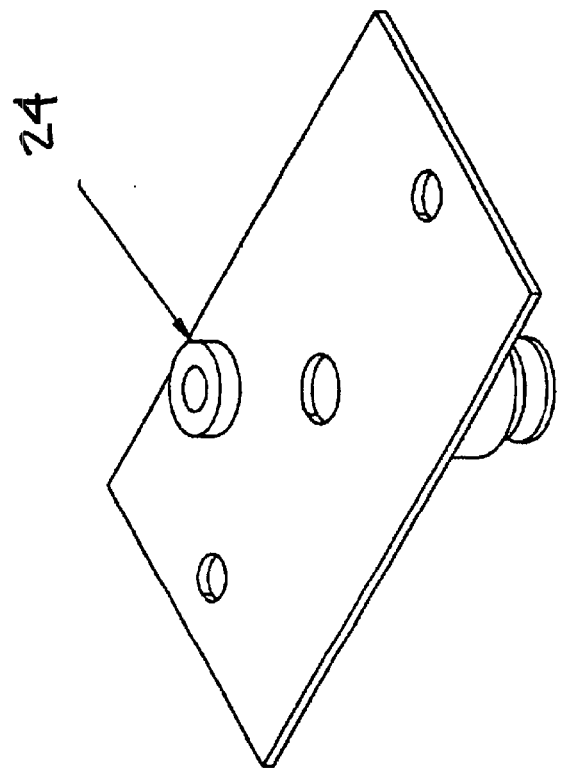
FIG. 4 is an exploded bottom perspective view of the fame portion shown in FIG. 3.

Details of frame portion 12 will now be described with reference to FIGS. 3–5. Referring first to FIGS. 3 and 4, exploded top and bottom perspective views, respectively, are provided for the frame portion 12 of latching system 10. Frame portion 12 includes a base plate 16 made from sheet metal, for example, and having a pair of opposed mounting holes 18 as well as a central through-hole 20. Although base plate 16 is illustrated as a separate component from the fame of the computer housing (not shown), the frame itself can be used to provide the structure of base plate 16 without the need for a separate component such as base plate 16. In fact, a stud (as described in further detail later) can be screwed into or otherwise mounted directly to the frame. In any event, the stud is preferably rigidly attached, directly or indirectly, to the frame. Also, although the stud may be threaded into the frame or into a component attached to the frame, the stud can be mounted by means of a weld, a rivet, internal threads formed in the stud, or any other suitable fastening means.

A threaded latching stud 22 includes a portion that extends through the through-hole 20. Stud 22 is engaged to base plate 16 by means of a fastener such as captive nut 24, which is positioned adjacent the opposite surface of base plate 16 (FIG. 4). Captive nut 24 can be provided with 10–32 female threads, for example, in order to engage 10–32 male threads on an outer surface of the stud's body, as will be described further with reference to FIG. 5. Accordingly, in this embodiment, the stud 22 is rigidly engaged to base plate 16 so that the axis of stud 22 extends substantially perpendicular to the plane of base plate 16.

Figure 5:
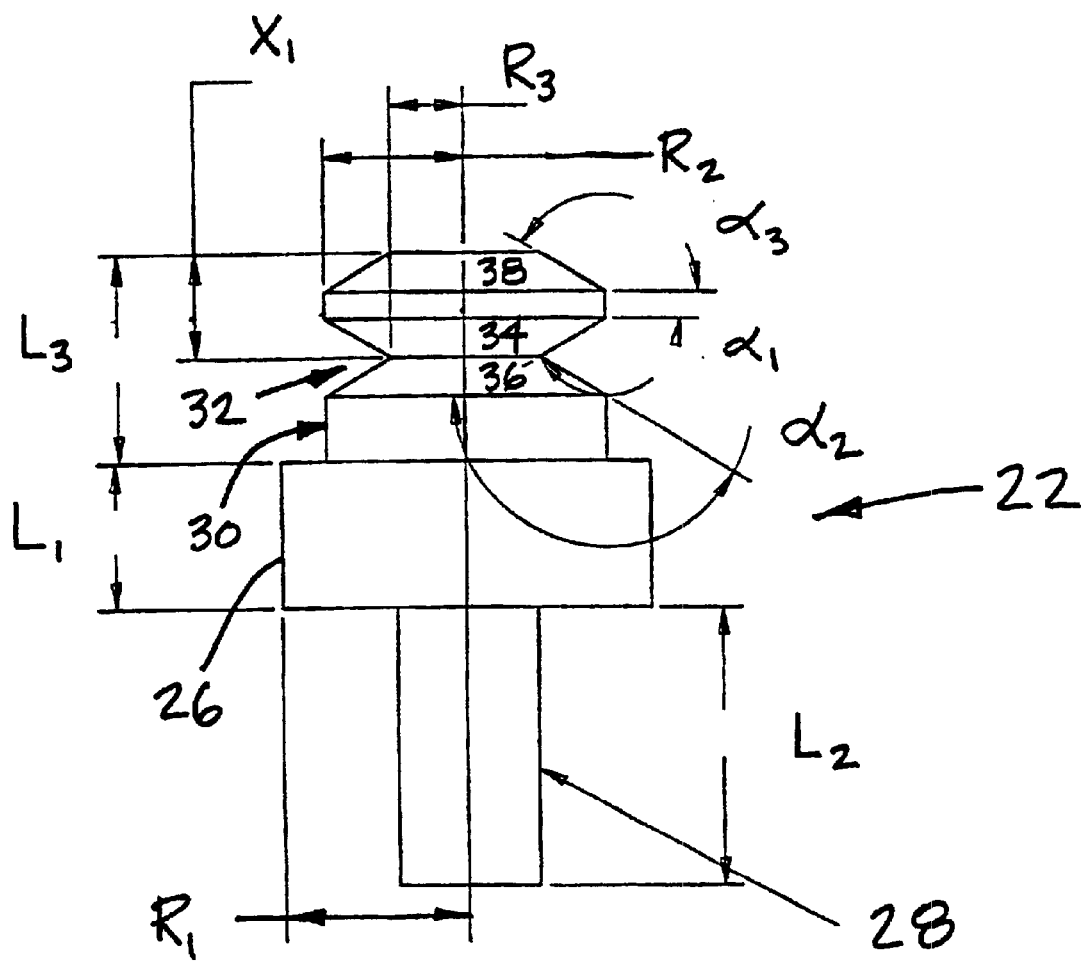
FIG. 5 is a side view of an embodiment of a stud component of the frame portion shown in FIGS. 3 and 4.

Referring now to FIG. 5, details of stud 22 will now be provided. Threaded latching stud 22 includes a body portion 26 having a radius $R_1$ and a length $L_1$. Threaded latching stud 22 also has a threaded end portion 28 for engagement with the captive nut 24 shown in FIG. 4. Threaded end portion 28 can be provided with 10–32 male threads, for example, extending over a length $L_2$ of threaded end portion 28.

Threaded latching stud 22 also has a grooved end portion 30 having a length $L_3$ and a radius $R_2$. A groove 32 is defined in the outer surface of grooved end portion 30. The groove's valley is positioned at a distance $X_1$ from the end of the stud 22. Groove 32 is defined by surfaces 34 and 36 extending between the outer surface of end portion 30 and the valley of groove 32. Surface 34 is oriented at an angle $\alpha_1$, with respect to a plane perpendicular to the axis of stud 22. Surface 36 of groove 32 is oriented at an angle $\alpha_2$ with respect to the perpendicular plane. Although a variety of angles can be selected to form the surfaces 34 and 36 of groove 32, angles $\alpha_1$ and $\alpha_2$ are preferably about 150°. Also, although angles $\alpha_1$ and $\alpha_2$ are preferably the same as one another, angles $\alpha_1$ and $\alpha_2$ can also be different from one another. Also, although groove 32 is illustrated as being formed from two intersecting surfaces 34 and 36, the groove can also be arcuate or otherwise formed from a continuous surface. Any surface capable of engagement with a structure such as a radial spring is suitable.

End portion 30 has a radius $R_3$ at the location of the groove's valley. It will be appreciated that the size of surfaces 34 and 36, as well as the magnitude of angles $\alpha_1$ and $\alpha_2$, can be varied in order to modify the radius $R_3$.

A chamfer or beveled surface 38 is provided at an end of end portion 30. Surface 38 is oriented at an angle $\alpha_3$ with respect to the perpendicular plane. Surface 38 is provided in order to facilitate the insertion of stud 22 into a radial spring, as will be described in further detail later. Although angle $\alpha_3$ is not critical to the invention, it is desired for angle $\alpha_3$ to be about 150°.

The door portion 14 of latching system 10 will now be described with reference to FIGS. 6–8. Referring first to the top exploded perspective view shown in FIG. 6, door portion 14 includes a sheet metal base plate 40 having opposed mounting holes 42 for mounting base plate 40 to a door structure such as the door of a computer housing. Base plate 40 also includes a pair of opposed mounting holes 44 to facilitate mounting of a radial spring housing, which will be described later in further detail. Also, a through-hole 46 is provided in the center of base plate 40 for the passage of stud 22 of frame portion 12.

Door portion 14 also includes a radial spring housing 48, details of which will be described with reference to FIGS. 7 and 8. Radial spring housing 48 is configured to house a radial spring 50 and to constrain the radial expansion of spring 50. Rivets 52 (only one shown in FIG. 6) and rivet washers 54 are provided to mount radial spring housing 48 to base plate 40, thereby providing a rigid assembly. Alternatively, the radial spring housing 48 can be attached to the base plate or to the door itself by weldment, adhesive, or by another mechanical fastener formed from the same or a different material. Also, alternative means can be used for holding the spring within the housing.

Figure 8:
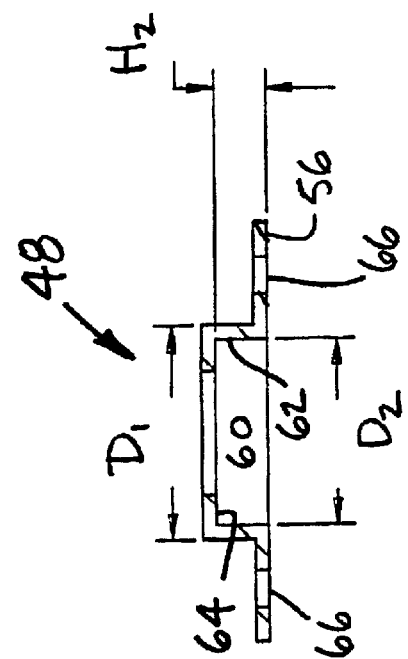
FIG. 8 is a cross-sectional side view of the housing component shown in FIG. 7.
Figure 7:
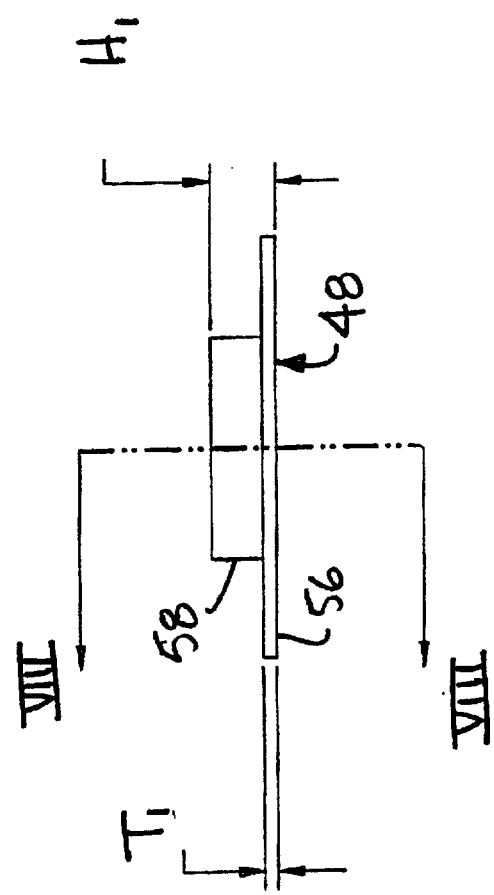
FIG. 7 is a side view of an embodiment of a housing component of the door portion shown in FIG. 6.

Referring now to FIGS. 7 and 8, details of radial spring housing 48 will now be provided. Radial spring housing 48 includes a flange portion 56 having a thickness $T_1$ and a body portion 58 having a height $H_1$ and an outer diameter $D_1$.

As shown in FIG. 8, the surfaces of radial spring housing 48 define a radial spring cavity 60 having a height $H_2$ and a diameter $D_2$. More specifically, cavity 60 is defined by a surface 62, a surface 64, and a facing surface of base plate 40. Surface 62 provides radial constraint for limiting radial expansion of an outer surface of radial spring 50, and surface 64 cooperates with the facing surface of base plate 40 to provide axial constraint for radial spring 50 in a direction along the central axis of the spring.

Figure 6:
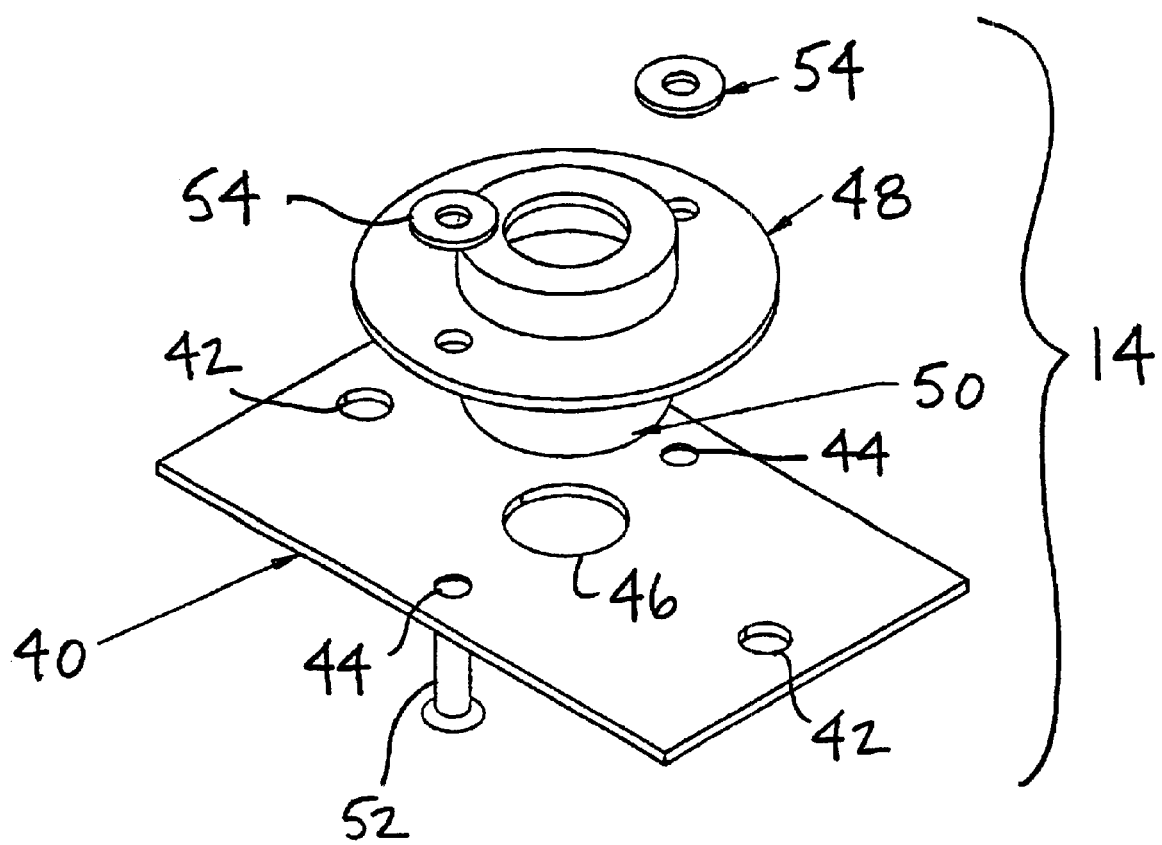
FIG. 6 is an exploded top perspective view of an embodiment of a door portion of the latching system shown in FIG. 1A.

Mounting holes 66 on the flange portion 56 of radial spring housing 48 are provided to facilitate mounting of housing 48 to base plate 40 utilizing the rivets 52 and washers 54 shown in FIG. 6. Radial spring housing 48 therefore provides a rigid structure by which radial spring 50 is constrained from radial and axial movement Accordingly, although an inner surface of radial spring 50 can expand radially outwardly with respect to the axis of stud 22, an outer surface of radial spring 50 is constrained from radial outward movement by surface 62 of housing 48.

In use, latching system 10 illustrated in FIGS. 1A and 2–8 provides a functional engagement between a structure such as a door and an adjacent structure such as a frame. The structures are engaged as they are brought together to the closed position illustrated in FIG. 1A. In that closed position, the stud 22 enters the radial spring 50 causing the inner surface of radial spring 50 to expand radially outwardly and then to relax within groove 32 of stud 22. Because the diameter of the grooved end portion 30 of stud 22 is larger than the relaxed inner diameter of radial spring 50, a friction fit between the radial spring 50 and the groove 32 prevents unintended separation of the structures.

More specifically, surface 34 of stud 22 resists axial separation of radial spring 50 from stud 22. In order to separate the structures, and in order to release stud 22 from radial spring 50, a manual force is applied to pull door portion 14 away from frame portion 12. To facilitate such separation, a handle or similar grasping structure can be provided on door portion 14 so that the user of the latching system 10 can disengage the stud from the radial spring.

In order to re-engage the door portion 14 and the frame portion 12, door portion 14 is moved to a position adjacent frame portion 12 so that stud 22 extends through the through-hole 46 in base plate 40, through the central opening in radial spring 50, and through the radial spring housing 48. The beveled surface 38 of stud 22 helps to facilitate insertion of stud 22 into radial spring 50, the inner source of which must expand to receive the grooved end portion 30 of stud 22.

As is illustrated in FIGS. 1A, 1B, and 1C, the shoulder on stud 22 formed where body portion 26 meets grooved end portion 30 controls the gap between the door portion 14 and the frame portion 12. More specifically, the length $L_1$ of body portion 30 of stud 22 (FIG. 5) determines the gap between the door and the frame. For example, the radial spring 50 can push against surface 34 to ensure that the door surface (base portion 40) remains in contact with the stud's shoulder.

Alternatively, the position of groove 32 can help set the predetermined gap between the door portion 14 and the frame portion 12. In other words, the valley of groove 32 and the shoulder between body portion 26 and end portion 28 of stud 22 cooperate to provide a predetermined distance between the mated structures in order to provide a predictable gap therebetween. This distance can be altered by changing the position $X_1$ of groove 32 on stud 22, by changing the length $L_3$ of grooved end portion 30, by changing the length $L_1$ of body portion 26, etc.

Accordingly, if multiple latching systems are used to secure large structures, and if the dimensions of the latch components are the same, then the gap provided by each of the latching Systems will be virtually the same. Also, the shoulder provided between the body portion 26 and grooved end portion 30 of stud 22 provides a stop to prevent over-insertion of stud 22 into radial spring 50.

Radial spring 50 is preferably a metallic spring formed into a torroidal configuration having an outer surface and an inner surface defining a passage for the stud. It is contemplated, however, that radial spring 50 can be replaced with any resilient member having a torroidal configuration, wherein the inner surface of such resilient member can move or expand radially outwardly with respect to the axis of the stud to accommodate the stud while the outer surface remains constrained. For example, an elastomeric or polymeric o-ring can be used in the place of radial spring 50.

According to preferred features of this invention, the resilient member is configured so that the inner surface is capable of expanding radially outwardly as the stud is inserted even though the outer surface of the resilient member is constrained against radially outward movement. For example, when a radial spring is used as a component of the latching system, it is believed that it may roll in place as the stud is inserted. In other words, friction between the outer surface of grooved end portion 30 of stud 22 and the inner surface of radial spring 50 causes the radial spring 50 to roll in place. The insertion of the stud is also believed to elastically deform the spring slightly so that the circular cross section of the spring's body becomes oval. In other words, the radial dimension of the spring's body becomes smaller than the axial dimension. Alternatively, it is also believed that the windings of the spring, which extend in a substantially radial direction when the spring is relaxed, become slightly skewed to the side upon insertion of the stud, thereby decreasing the radial dimension of the spring.

Another embodiment of a latching system according to this invention will now be described with reference to FIGS. 1B and 9-12. This embodiment differs from latching system 10 primarily in that a lever assembly is provided in order to facilitate disengagement of the structures by the user.

Figure 9:
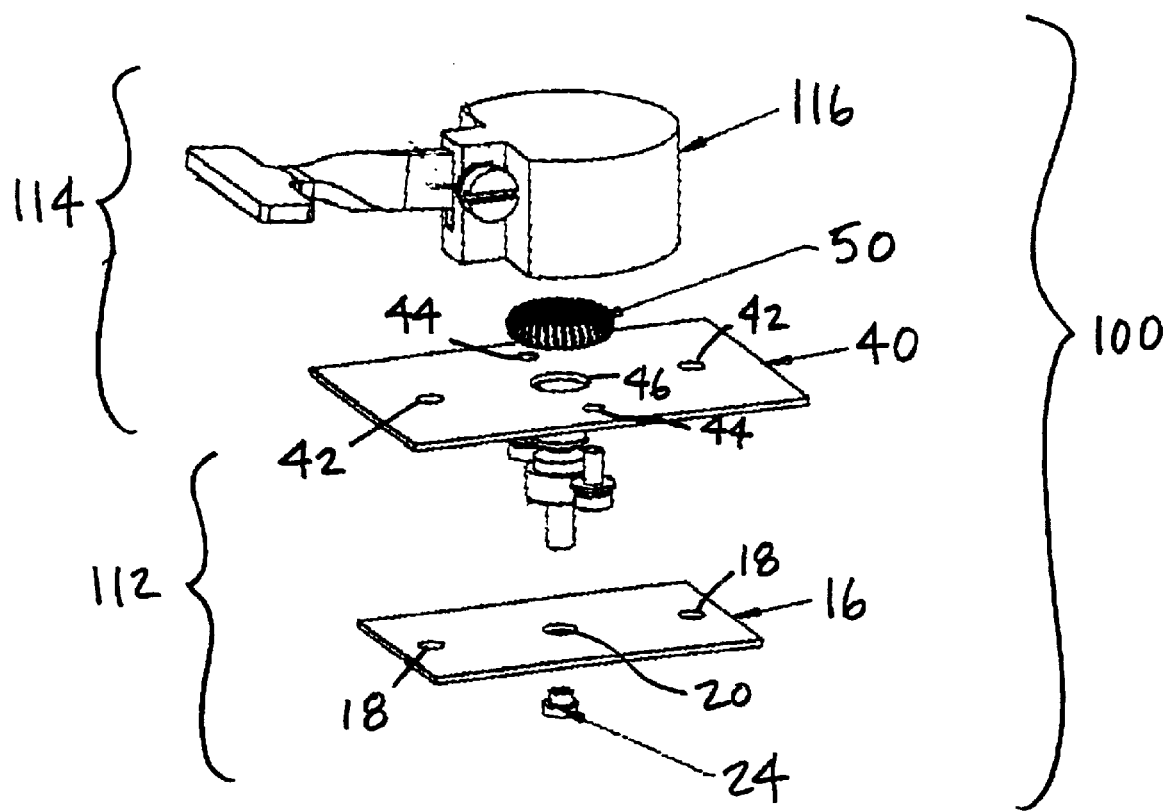
FIG. 9 is an exploded top perspective view of the latching system shown in FIG. 1B.

Referring first to FIGS. 1B and 9, a latching system 100 includes a frame portion 112 and a door portion 114. Like frame portion 12 of latching system 10, frame portion 112 of latching system 100 includes a frame member 16 having mounting holes 18 and a through-hole 20. Frame portion 112 also includes a stud 22. Stud 22 is rigidly engaged to frame member 16 by means of a captive nut 24.

Also, as with door portion 14 of latching system 10, door portion 114 of latching system 100 includes a door member 40 having a pair of opposed mounting holes 42 for mounting the door member 40 to a door structure. Door member 40 also includes a pair of opposed mounting holes 44 for mounting a lever/radial spring housing 116 to the door member 40, as will be described later. Door member 40 also includes a through-hole 46 sized and positioned to permit passage of rigid stud 22 therethrough.

Also, like door portion 14 of latching system 10, door portion 114 of latching system 100 includes a radial spring 50. In this case, however, radial spring 50 is captivated within the lever/radial spring housing assembly 116. As will be described with reference to FIGS. 10-12, lever/radial spring housing assembly 116 includes a body 120 to which a lever 130 is attached Lever housing retention screws 118 extend through mounting holes 44 provided in door member 40 and engage lever/radial spring housing assembly 116 in order to fasten housing assembly 116 to door member 40.

Figure 10:
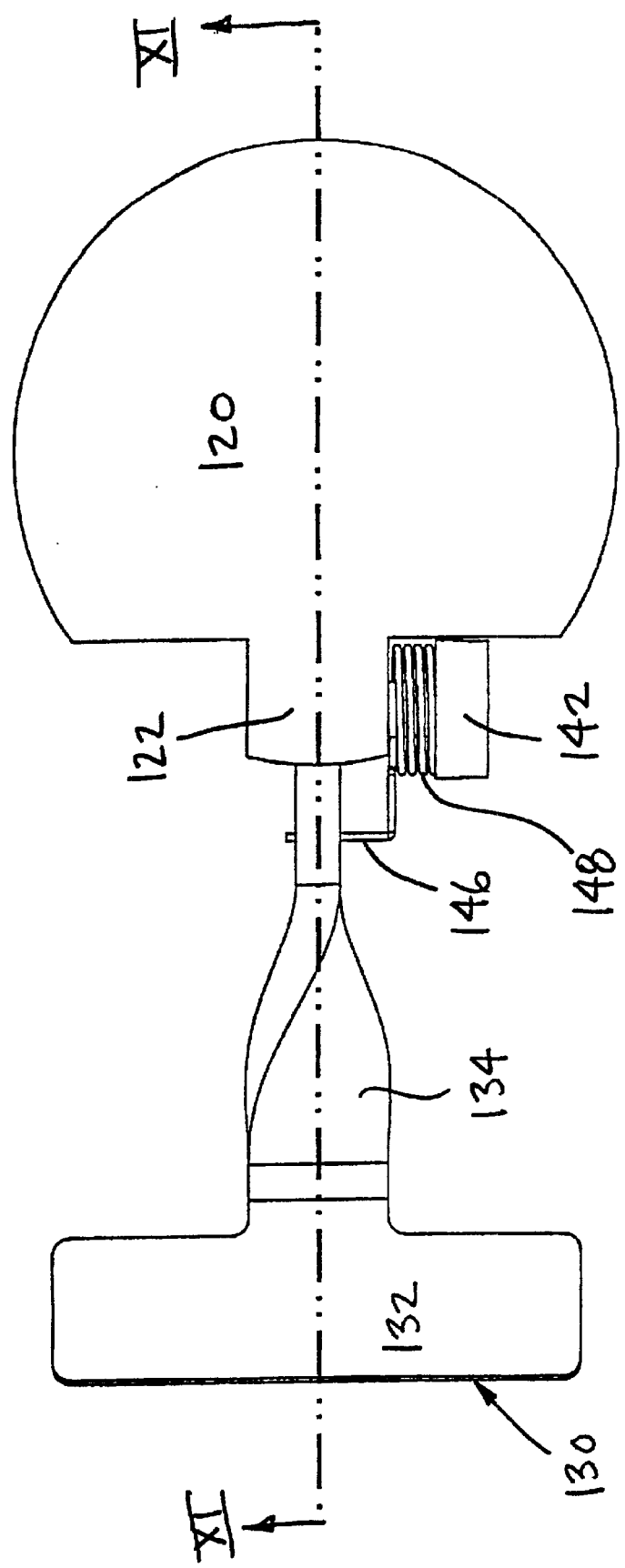
FIG. 10 is a top view of an embodiment of a lever and spring housing assembly of the latching system shown in FIG. 9.

As illustrated in FIG. 10, lever/radial spring housing assembly 116 includes a body 120 and a lever 130. Body 120 of assembly 116 includes a lever-mounting portion 122 to which lever 130 is mounted. Also, as illustrated in the cross-sectional view shown in FIG. 11, body 120 includes a slotted lever arm cavity 124 as well as a radial. spring housing cavity 126.

Radial spring housing cavity 126 is defined by an outer surface 128 for radial constraint of radial spring 50. Radial spring housing cavity 126 is also defined by an end surface 130 for axial constraint of radial spring 50. A facing surface of door member 40 also captures radial spring 50 within cavity 126.

Figure 11:
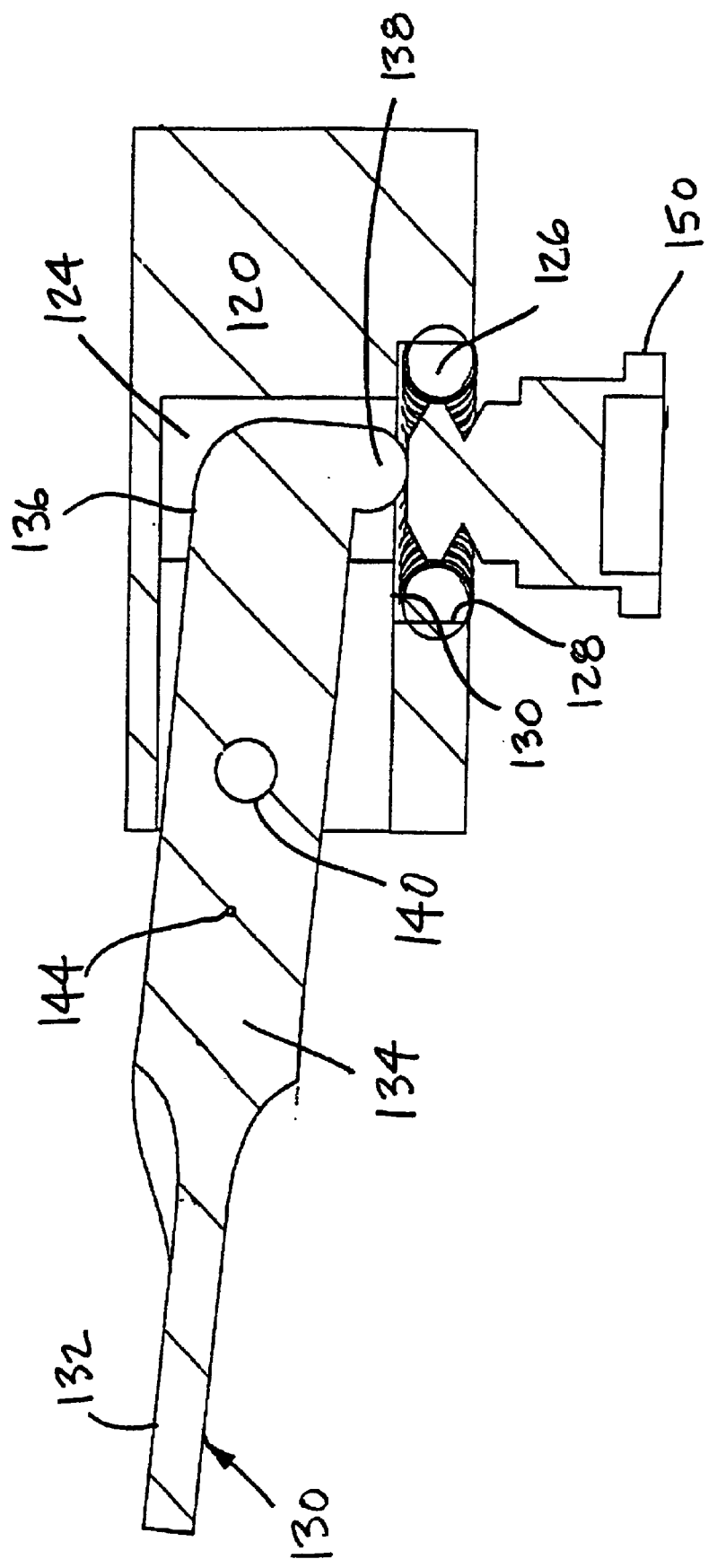
FIG. 11 is a cross-sectional side view of the lever and spring housing assembly shown in FIG. 10.

As illustrated in FIGS. 10 and 11, lever 130 includes a grasping portion 132, which can be grasped by the user of the system in order to release the stud. Adjacent to grasping portion 132 is an outer arm portion 134 extending outwardly from body 120 of assembly 116. An inner arm portion 136 of lever 130 is mounted within lever arm cavity 124 of body 120. More specifically, a mounting hole 140 is provided along the length of lever 130 so that a lever pivot screw 142 (FIG. 10) can be utilized to mount lever 130 to body 120 for pivotal motion at lever mounting portion 122. Also, a mounting hole 144 is provided along outer arm portion 134 of lever 130 in order to accept an arm portion 146 of a torsion spring 148 (FIG. 10).

It will be understood that torsion screw 148 biases the grasping portion 132 of lever 130 in the downward position toward door member 40. A user of lever 130 lifts grasping portion 132 upwardly to tile position shown in FIG. 11 in order to release a latch stud from the radial spring 50. More specifically, a stud contact portion 138 of lever 130 is provided at the end of inner arm portion 136 of lever 130. Stud contact portion 138 is positioned for contact with an upper surface of the latch stud. Accordingly, by raising grasping portion 132 of lever 130 upwardly to the position shown in FIG. 11, lever 130 pivots about the axis of lever pivot screw 142 so that stud contact portion 138 is urged downwardly against the upper surface of the latch stud, thereby forcing the stud out from within the radial spring.

Figure 12:
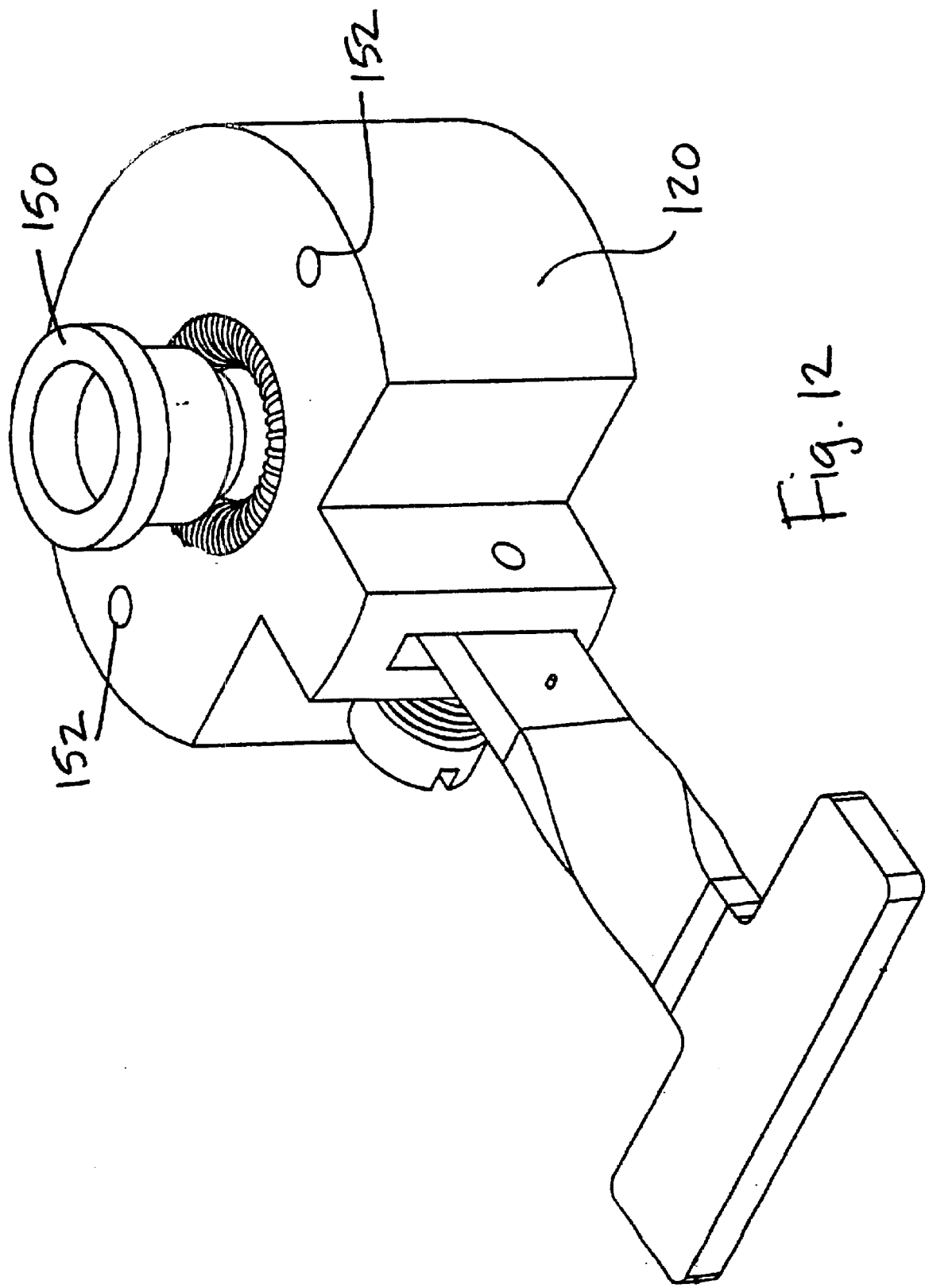
FIG. 12 is an exploded bottom perspective view of the lever and spring housing assembly shown in FIG. 10.
Figure 13:
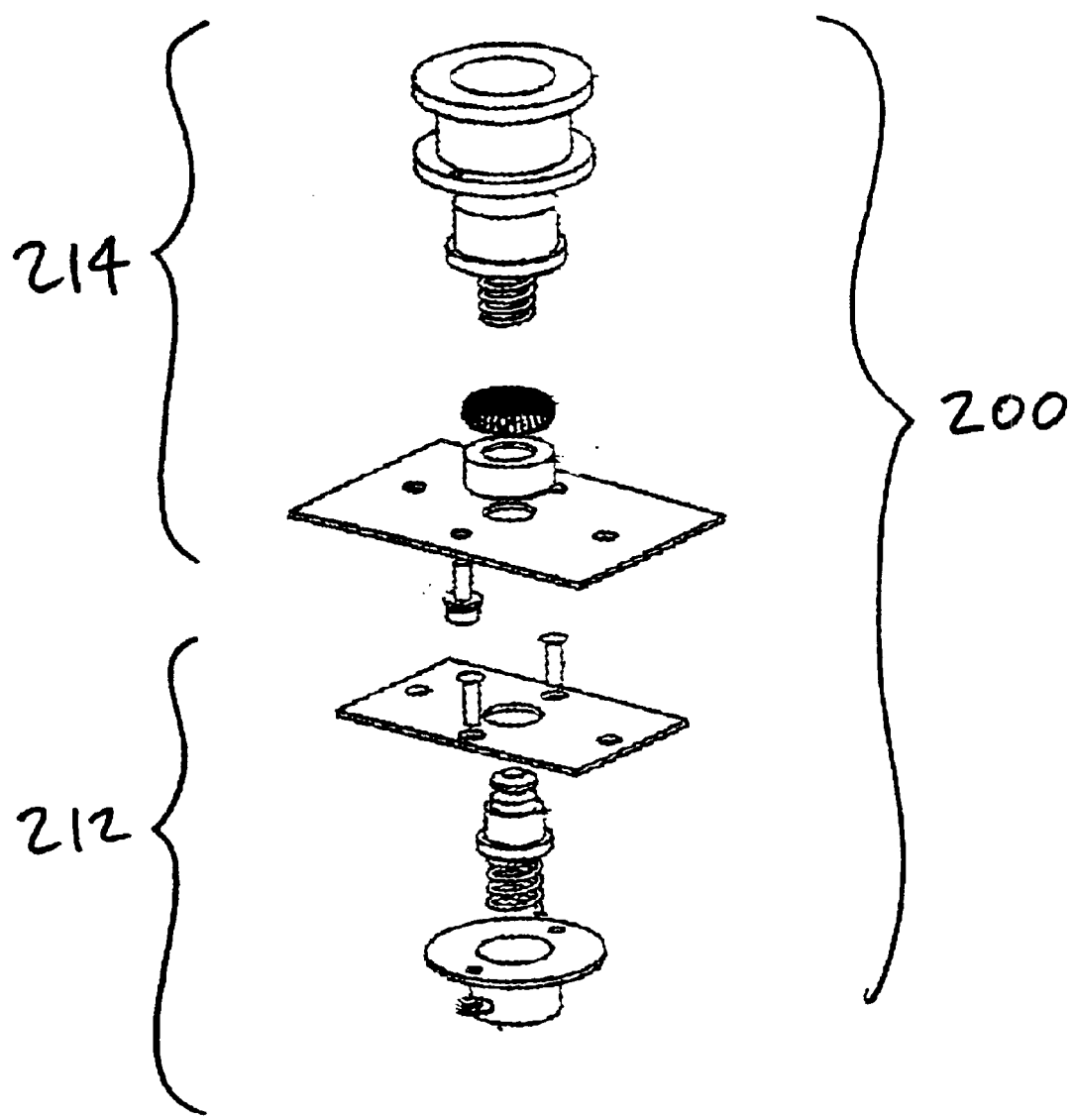
FIG. 13 is an exploded top perspective view of the latching system shown in FIG. 1C.

As illustrated in FIG. 12, which shows a perspective bottom view of assembly 116, body 120 of assembly 116 is provided with a pair of mounting holes 152. Mounting holes 152 are positioned to receive lever housing retention screws 118 in order to secure body 120 to door member 40. Mounting holes 152 are preferably tapped holes for engagement of retention screws 118.

It will be noted in FIGS. 11 and 12 that a latching stud 150 differs from latching stud 22 (FIG. 9) in its structure to illustrate an alternative embodiment of the stud assembly. Latch stud 150 is similar to floating latch stud 224, which will be described later with reference to FIGS. 15 and 16. Although stud 22 (FIG. 9) is suitable for use in the embodiment illustrated in FIGS. 9-12, a floating-style latch stud 150 may be preferred. Generally, a floating latch stud is spring mounted to permit axial movement of the stud with respect to a frame member to which it is mounted. A spring mounted stud therefore facilitates partial or even complete disengagement of the stud from the radial spring without relative movement of their respective structures. In other words, a spring mounted stud on a frame can be at least partially released from a radial spring mounted on a door without moving the door away from the frame. Alternatively, the spring mounted stud can be released from a radial spring in conjunction with movement of the structures, such as a door and a frame, away from one another.

Referring now to FIGS. 1C and 13–29, yet another preferred embodiment of a latching system according to this invention will now be described. As with latching systems 10 and 100, latching system 200 includes a housing/cabinet structure such as a frame portion 212 and a housing/cabinet structure such as a door portion 214. The latching system 200 facilitates releasable engagement of the door and frame portions to one another. The latching system 200 differs, however, from latching systems 10 and 100 in that latching system 200 utilizes a button mechanism to help the user release the stud from the radial spring when it is desired to separate the door and frame portions from one another.

Figure 14:
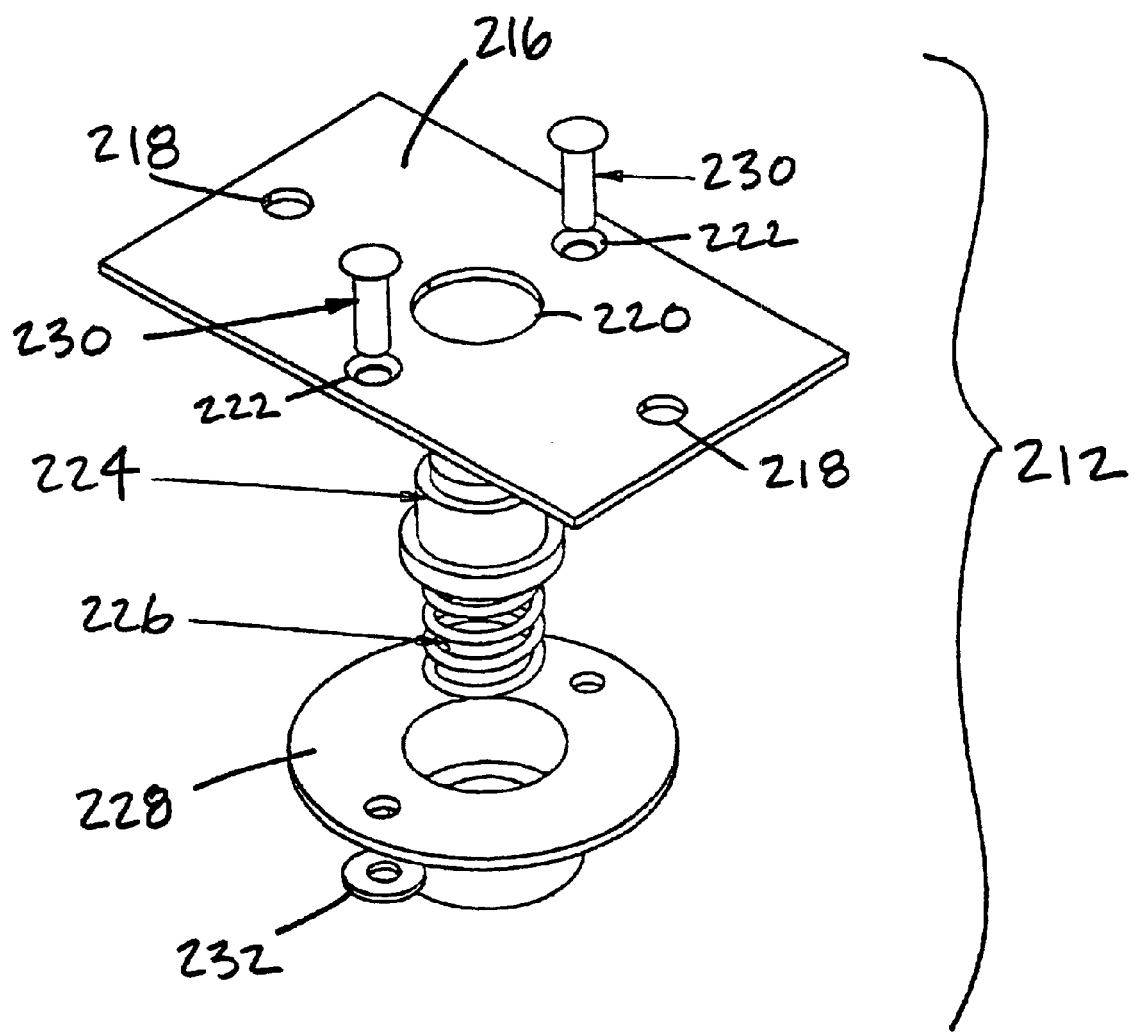
FIG. 14 is an exploded top perspective view of an embodiment of a frame portion of the latching system shown in FIG. 13.
Figure 20:
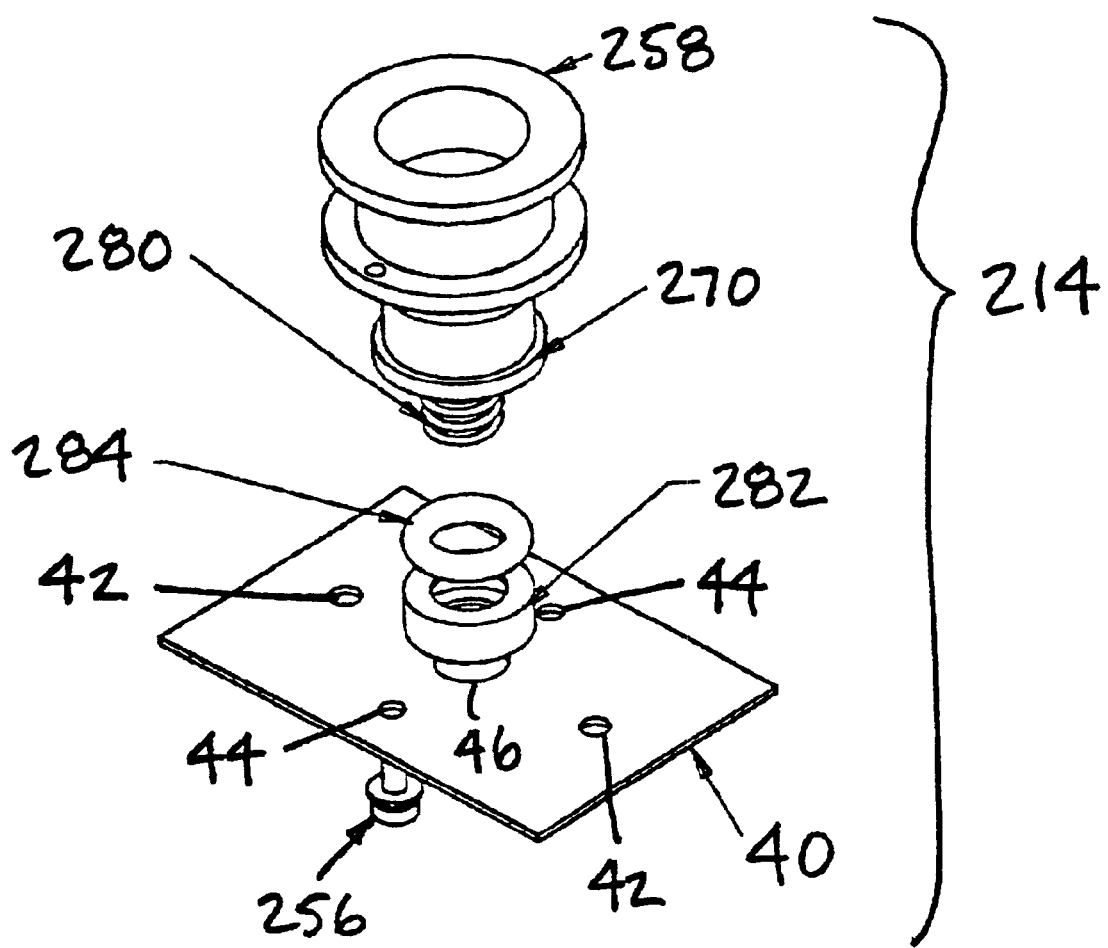
FIG. 20 is an exploded top perspective view of an embodiment of the door portion of the latching system shown in FIG. 13.

Preferred features of frame portion 212 will now be described with reference to FIGS. 14–19. Referring first to FIG. 14, which provides an exploded perspective view, door portion 212 includes a sheet metal mounting plate 216. A pair of opposed mounting holes 218 are provided for mounting sheet metal mounting plate 216 to a frame structure (not shown). Also provided in mounting plate 216 is a pair of opposed mounting holes 222 for mounting a spring and stud housing as well as a through-hole 220 to permit passage of the stud through the base plate 216.

Frame portion 212 also includes a "floating" latch stud 224, a latch spring 226, and a stud/spring housing 228. A pair of rivets 230 and a pair of washers 232 (only one shown) are used to secure stud/spring housing 228 to mounting plate 216.

Details of floating latch stud will now be described with reference to FIGS. 15 and 16. Floating latch stud 224 is adapted to be spring mounted so that it can be moved along its longitudinal axis. Stud 224 includes a body portion 234 having a radius $R_4$ and a length $L_4$. Stud 224 also includes a flanged end portion 236 having a radius $R_5$ greater than that of radius $R_4$ of body portion 234. Flanged end portion 236 also has a length $L_5$, thereby providing a shoulder spaced from the bottom end of stud 224 as shown in FIG. 15.

As with stud 22, stud 234 includes a grooved end portion 238 having a length $L_6$ and a radius $R_6$. A shoulder is formed at the intersection of body portion 234 and grooved end portion 238. A groove 240 is defined in an outer surface of grooved end portion 238, and the valley of groove 240 is located at a distance $X_2$ from the upper end of stud 224 as shown in FIG. 15.

More specifically, groove 240 is defined by surfaces 242 and 244. Surface 242 is oriented at an angle $\alpha_4$ with respect to the axis of stud 224. Surface 244 of groove 240 is oriented at an angle $\alpha_5$ with respect to the axis of stud 224. Angle $\alpha_4$ and angle $\alpha_5$ are preferably the same. For example, both angles can be about 60° or, alternatively, the angles can be different from one another, if desired. Surfaces 242 and 244 meet at the groove's valley, thereby providing groove 240 with a radius $R_7$ at the groove's valley. As was described with reference to stud 22, the intersecting surfaces 242 and 244 can be substituted with an arcuate surface or other configuration, so long as the resulting surface is capable of engagement with a resilient member such as a radial spring A chamfer or bevel surface 246 is provided at an end portion of stud 224 as is illustrated in FIG. 16. Surface 246 is oriented at an angle $\alpha_6$ with respect to a plane perpendicular to the axis of stud 224. Angle $\alpha_6$ is preferably about 210°, but other angles can be selected as well.

As is illustrated in FIG. 16, a recess 248 is provided in a bottom portion of stud 224. Recess 248 has a depth $H_3$ and a radius $R_8$. Recess 248 is sized and configured to receive an end portion of latch spring 226. It will be understood that latch spring 226 acts to bias floating latch stud 224 away from stud/spring housing 228. Latch spring 226 permits the movement of floating latch stud 224 toward housing 228 when latch stud 224 is compressed toward latch spring 226.

Referring now to FIGS. 17–19, preferred features of stud/spring housing 228 will now be described. Referring first to the side view shown in FIG. 17, housing 228 includes a flange portion 250 in which two opposed mounting holes 251 (FIG. 19) are provided at a distance $X_3$ from one another, center-to-center. Body portion 252 of housing 228 has a height $H_4$ and an outside diameter $D_4$.

Referring to the cross-sectional side view shown in FIG. 18, housing 228 defines an internal cavity 254 for receiving an end portion of floating latch stud 224 therein. More specifically, cavity 254 is provided with a depth $H_5$ and a diameter $D_5$ sized to receive the flanged end portion 236 of stud 224. Housing 228 also defines a recess 256 for receiving an end portion of latch spring 226. Recess 256 is provided with a depth $H_6$ and a diameter $D_6$ sized to receive the end of spring 226.

It will be understood that frame portion 212, with floating latch stud 224, permits axial movement of stud 224 with respect to the mounting plate 216 and the frame (not shown). This floating arrangement for the stud helps to facilitate removal of the stud is from the radial spring when it is desired to separate door portion 214 from frame portion 212. As will be described later in further detail, a push button component of door portion 214 can be depressed by the user of the latching system to urge the stud out from the radial spring along its axis.

Preferred features of door portion 214 of latching system 200 will now be described with reference to FIGS. 20–29. It will be appreciated that door portion 214 differs from door portions 14 and 114 in that door portion 214 provides a push button assembly to facilitate the release of the stud 224 from the radial spring. Door portion 214 is similar to door portion 14 in that it includes a sheet metal base plate 40 having opposed mounting holes 42, opposed mounting holes 44, and a through-hole 46.

Door portion 214 also includes a latch button retention collar 258, which is secured to base plate 40 by a pair of retaining screws 265 (only one shown). A latch button 270 is positioned at least partially within latch button retention collar 258, and a compression spring 280 extends into latch button 270. A radial spring retention housing 282 is provided to house and constrain radial expansion and axial movement of a radial spring 284.

Figure 21:
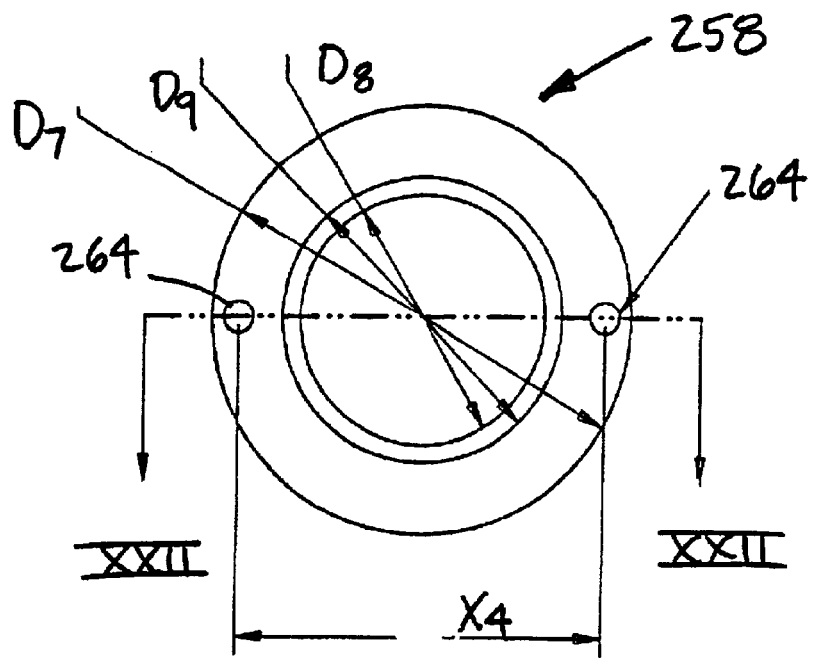
FIG. 21 is a bottom view of an embodiment of a collar component of the door portion illustrated in FIG. 20.
Figure 22:
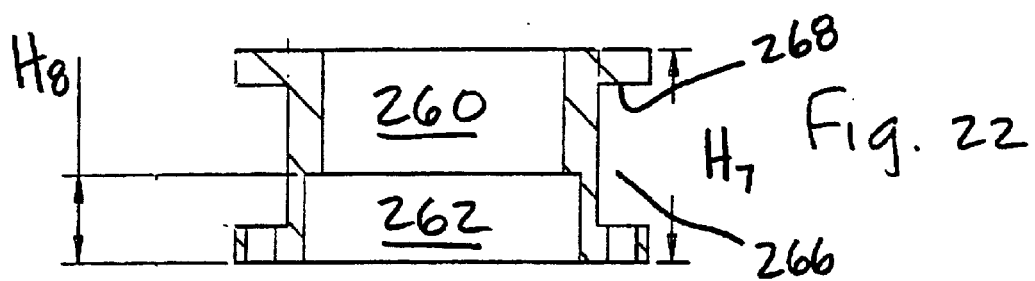
FIG. 22 is a cross-sectional side view of the collar component shown in FIG. 21.

Referring now to FIGS. 21 and 22, further preferred details of latch button retention collar 258 will now be provided. Latch button retention collar 258 has an outer diameter $D_7$ and an overall height $H_7$. An access opening 260 extends through retention collar 258 so that the finger of a user can access latch button 270. Access opening 260 is provided with a diameter $D_8$ in order to accommodate a portion of latch button 270, as will be described with reference to FIGS. 23–26. Retention collar 258 also includes a recessed opening 262 having a diameter $D_9$ sized to receive another portion of latch button 270. Recessed opening 262 is also provided with a depth $H_8$.

A pair of opposed mounting holes 264 are provided in collar 258 so that collar 258 can be secured to base plate 40 by means of a pair of retaining screws 265. For example, mounting holes 264 can be drilled and tapped with a 6–32 female thread in order to accommodate 6–32 threaded retaining screws. The threaded mounting holes 264 are separated by a distance $X_4$, center-to-center, in order to correspond to the center-to-center distance between mounting holes 44 in base plate 40.

Latch button retention collar 258 is formed with a peripheral recess 266 in order to provide a gripping surface 268 for the fingers of a user. More specifically, a user of door portion 214 can press latch button 270 inwardly to release latch stud 224 by depressing latch button 270 with his or her thumb. The user's index and middle fingers can engage gripping surface 268 at opposite sides of collar 258 in order to provide a pulling action in order to separate door portion 214 from frame portion 212. In other words, door portion 214 is separated from frame portion 212 by the combined action of the pulling action on collar 258 and the pushing action on latch button 270.

Referring now to FIGS. 23–26, preferred details of latch button 270 will now be described. Latch button 270 is provided with a body 272 having a height $H_9$ and a diameter $D_{10}$. The diameter $D_{10}$ of body 272 of button 270 is selected so that it will fit within access opening 270 of retention collar 258. Latch button 270 is also provided with a flange 274 having a height $H_{10}$ and a diameter $D_{11}$. The diameter $D_{11}$ of flange 274 is selected to fit within recessed opening 262 in collar 258. Accordingly, an upper edge of flange 274 prides a stop surface that can bear against the shoulder defined between access opening 260 and recessed opening 262 of collar 258. Accordingly, the upward mobility of button 270 is limited by the shoulder in collar 258, and the spring 280 biases the button 270 against the shoulder.

Latch button 270 is also provided with an annular recess 276, which defines a stud contact member 278 at the center of button 270. More specifically, annular recess 276 has an outer diameter $D_{12}$ and an inner diameter $D_{13}$. Diameters $D_{12}$ and $D_{13}$ are selected in order to permit compression spring 280 to extend therein. Accordingly, compression spring 280 biases latch button 270 upwardly within collar 258 with flange 274 of button 270 bearing against the shoulder of recessed opening 262.

Upon the exertion of a force downwardly against latch button 270 by a user of door portion 214, latch button 270 can be depressed and compression spring 280 can be compressed so that stud contact member 278 of latch button 270 moves downwardly for contact with an upper surface of stud 224. In this manner, a user can actuate latch button 270 in order to release the stud from the radial spring 284, thereby separating door portion 214 from frame portion 212 of latching system 200.

Figure 28:
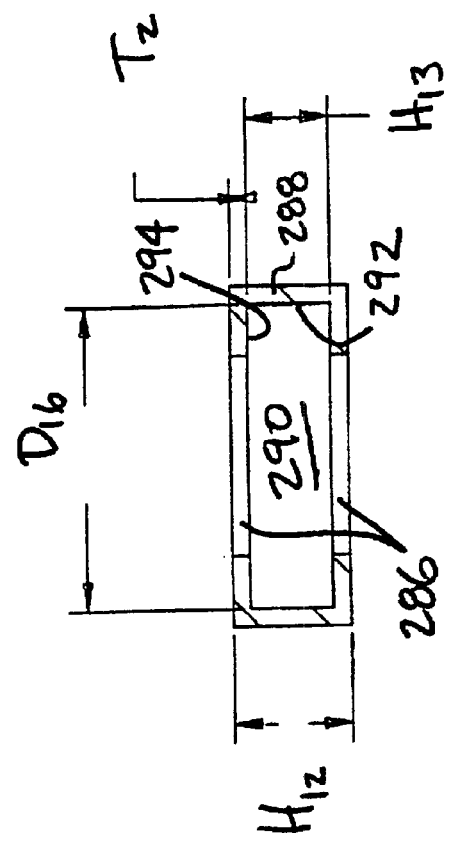
FIG. 28 is a cross-sectional side view of the housing component shown in FIG. 27.
Figure 29:
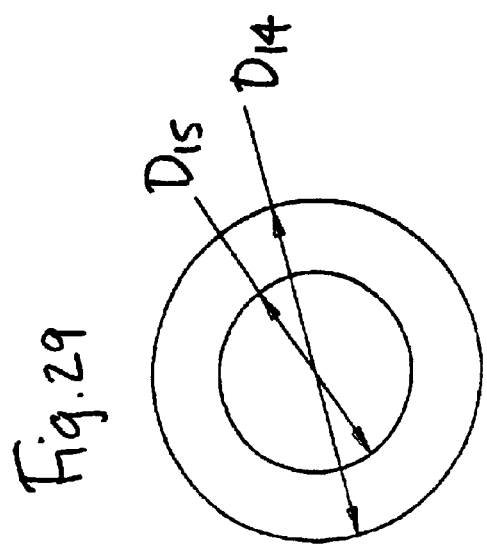
FIG. 29 is a top view of the housing component shown in FIGS. 27 and 28.
Figure 27:
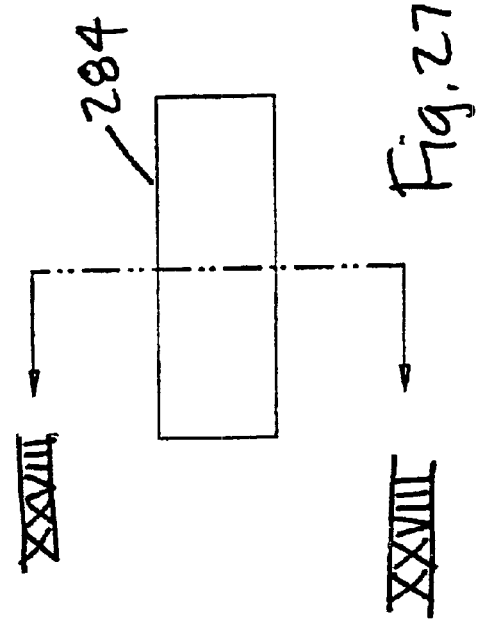
FIG. 27 is a side view of an embodiment of a housing component of the door portion illustrated in FIG. 20.

Referring now to FIGS. 27–29, preferred details of a radial spring retention housing 282 will now be described. As was described before with reference to FIG. 20, retention housing 282 is sized and shaped to constrain a radial spring 284 so as to prevent radial-outward movement of an outer surface of radial spring 284 and to prevent movement of radial spring 284 along its central axis. Retention housing 282 is provided with a height $H_{12}$ and an outer diameter $D_{14}$. End openings 286 are provided for passage of latch stud 224. In other words, a diameter $D_{15}$ of openings 286 is selected so that the grooved end portion 238 of the latch stud can extend therethrough.

Retention housing 282 is provided with a wall 288 having a thickness $T_2$ so that a rigid housing is provided. Wall 288 therefore defines a radial spring cavity 290 within which the radial spring 284 can be captured. Radial spring cavity 290 is provided with a cavity diameter $D_{16}$ and a cavity height $H_{13}$. Accordingly, radial spring cavity 290 is defined by an annular surface 292, which constrains an outer surface of radial spring 284 from radial-outward expansion. Also, radial spring cavity 290 is defined by surfaces 294, which prevent axial movement of radial spring 284 along an axis of the stud.

Although radial spring retention housing 282 is illustrated with portions of wall 288 defining a pair of opposed surfaces 294, it will be appreciated that one of those surfaces can be eliminated and that the eliminated surface can, instead, be defined by a surface of base plate 40 when the door portion 214 is assembled. In other words, one surface 294 of retention housing 282 can cooperate with a surface of base plate 40 in order to constrain the radial spring 284 against axial movement.

Although various embodiments of this invention have been described with reference to exemplary features illustrated in the figures, it will be appreciated that further variations and modifications may be made without departing from the spirit or scope of the invention. For example, although the invention has been described with reference to embodiments wherein the stud is associated with the frame and the resilient member is associated with the door of a structural assembly, it is contemplated that the stud may be associated with the door and the resilient member may be associated with the frame instead.

Also, although various materials and dimensions have been referred to herein with reference to specific embodiments selected for illustration, it will be appreciated that a wide variety of dimensions and materials can be employed to practice this invention. For example, the stud, housing, button, and other system components described herein with reference to the figures need not be formed from the same material, and such components can be formed from any material that is sufficiently rigid. Accordingly, such components can be formed from metallic or polymeric materials, for example. The invention has also been described with reference to assemblies of components. It will be appreciated, however, that components described as separate components can be combined into fewer components and that components can also be separated into multiple components, depending upon engineering preferences as well as cost considerations.

Although this invention has been described with reference to frame and door structures of computer housing systems, it will be appreciated that the latching system according to this invention can be used in a wide variety of applications where two structures are intended to be releasably engaged to one another. It is contemplated that other modifications can be made to the embodiments selected for illustration in the figures. The scope of the invention, therefore, is separately defined in the appended claims.

What is claimed is:

1. A system for providing releasable engagement between two structures, said system comprising:

a stud extending outwardly from a first one of said structures along an axis, said stud having an outer surface oriented at an angle to said axis to define an outer diameter along at least an end portion of said stud; and a resilient member secured between surfaces of a second one of said structures, each of said surfaces being substantially perpendicular to said axis of said stud, said resilient member having a substantially torroidal configuration defining an opening, said opening having a relaxed state smaller than said outer diameter of said end portion of said stud;

wherein said opening of said resilient member is resiliently expandable radially outwardly to permit passage of said end portion of said stud upon application of a force parallel to said axis;

wherein said opening of said resilient member engages said outer surface of said stud when said resilient member is relaxed, thereby providing engagement between said structures;

wherein one of said surfaces is a door and said resilient member is positioned adjacent the surface of the door;

wherein said resilient member is positioned adjacent a surface of a door.

2. A latching assembly for providing releasable engagement between a door and a frame, said latching assembly comprising:

a stud extending outwardly from one of said door or said frame along an axis, said stud having an outer surface oriented at an angle to said axis; and a resilient member positioned adjacent a surface of the other one of said door or said frame, said resilient member having a substantially torroidal configuration, an outer surface of said resilient member contacting said surface of said other one of said door or said frame to prevent movement of said outer surface of said resilient member radially outwardly, an inner surface of said resilient member defining an opening moveable radially outwardly;

said resilient member having a relaxed position wherein said outer surface of said resilient member contacts said surface of said other one of said door or said frame and said opening is smaller than said stud to releasably engage said outer surface of said stud, and said resilient member having an expanded position wherein said opening is sized to permit passage of said stud.

3. The system as recited in claim 2, wherein said stud is mounted on said frame.

4. The system as recited in claim 2, wherein said stud is substantially cylindrical.

5. The system as recited in claim 2, wherein said surface of said stud defines a groove that extends about a periphery of said stud.

6. The system as recited in claim 2, wherein said resilient member comprises a radial spring.

7. A latching system for releasably engaging a door to a frame comprising:

a stud mounted on one of said door and said frame and having an axis and a surface, at least a portion of said surface being angled with respect to said axis of said stud; and a coiled spring mounted in a housing on the other one of said door and said frame and having an axis arranged in a circle to form a torroidal configuration and an outer surface constrained by contacting said housing to prevent movement of said outer surface of said coiled spring radially outward, said torroidal configuration of said spring defining an opening which is exposed when said door is open and is expandable by introduction of said stud therein to allow the stud to pass through said opening and which relaxes to releasably engage said angled surface of said stud, wherein a user of said latching system can release said stud from said coiled spring without the use of a tool.

8. A door assembly comprising:

a frame;

a door mounted for movement with respect to said frame;

a stud extending from one of said frame and said door along an axis, said stud having an outer surface oriented at an angle to said axis;

a resilient member retained adjacent a surface of the other one of said frame and said door, said resilient member having a substantially torroidal configuration defining an outer surface and an opening;

said opening of said resilient member being resiliently expandable from a relaxed diameter smaller than said stud to an expanded diameter sufficient to permit passage of said stud by application of a force along said axis biasing said frame and said door together;

said outer surface of said resilient member being in contact with said surface of said other one of said frame and said door, said surface being positioned to constrain said outer surface of said resilient member and prevent movement of said outer surface of said resilient member radially outwardly;

wherein when said door is closed with respect to said frame, said resilient member releasably engages said outer surface of said stud, thereby providing releasable engagement between said door and said frame, and wherein a user of said door assembly can release said stud from stud resilient member without the use of a tool.

* * * * *